United States Patent [19]

Franke et al.

[11] Patent Number: 5,071,264

[45] Date of Patent: Dec. 10, 1991

[54] ROLLING BEARING

[75] Inventors: Egon Franke; Helmut Basener, both of Aalen, Fed. Rep. of Germany

[73] Assignees: Franke & Heydrich KG, Aalen; KME Maschinenfabrik GmbH, Bopfingen, both of Fed. Rep. of Germany

[21] Appl. No.: 614,910

[22] Filed: Nov. 16, 1990

[30] Foreign Application Priority Data

Nov. 28, 1969 [DE] Fed. Rep. of Germany ....... 3939279

[51] Int. Cl.$^5$ ............................................. F16C 33/61
[52] U.S. Cl. .................................. 384/501; 384/502; 384/615
[58] Field of Search ............... 384/501, 615, 502, 503, 384/537, 570

[56] References Cited

U.S. PATENT DOCUMENTS 3,533,497 10/1970 Rojewski ............................ 384/501
4,568,205 2/1986 Basener ............................... 384/501
4,778,287 10/1988 Jacob et al. ......................... 384/615
4,797,008 1/1989 Helbig et al. ....................... 384/615

Primary Examiner—Lenard A. Footland
Attorney, Agent, or Firm—Herbert Dubno

[57] ABSTRACT

A radial or axial bearing has plastic casing rings formed as strips whose ends form junctions offset from those of the spring rings and/or race rings received in grooves and beds of the casing rings on which the bearings ride.

20 Claims, 9 Drawing Sheets

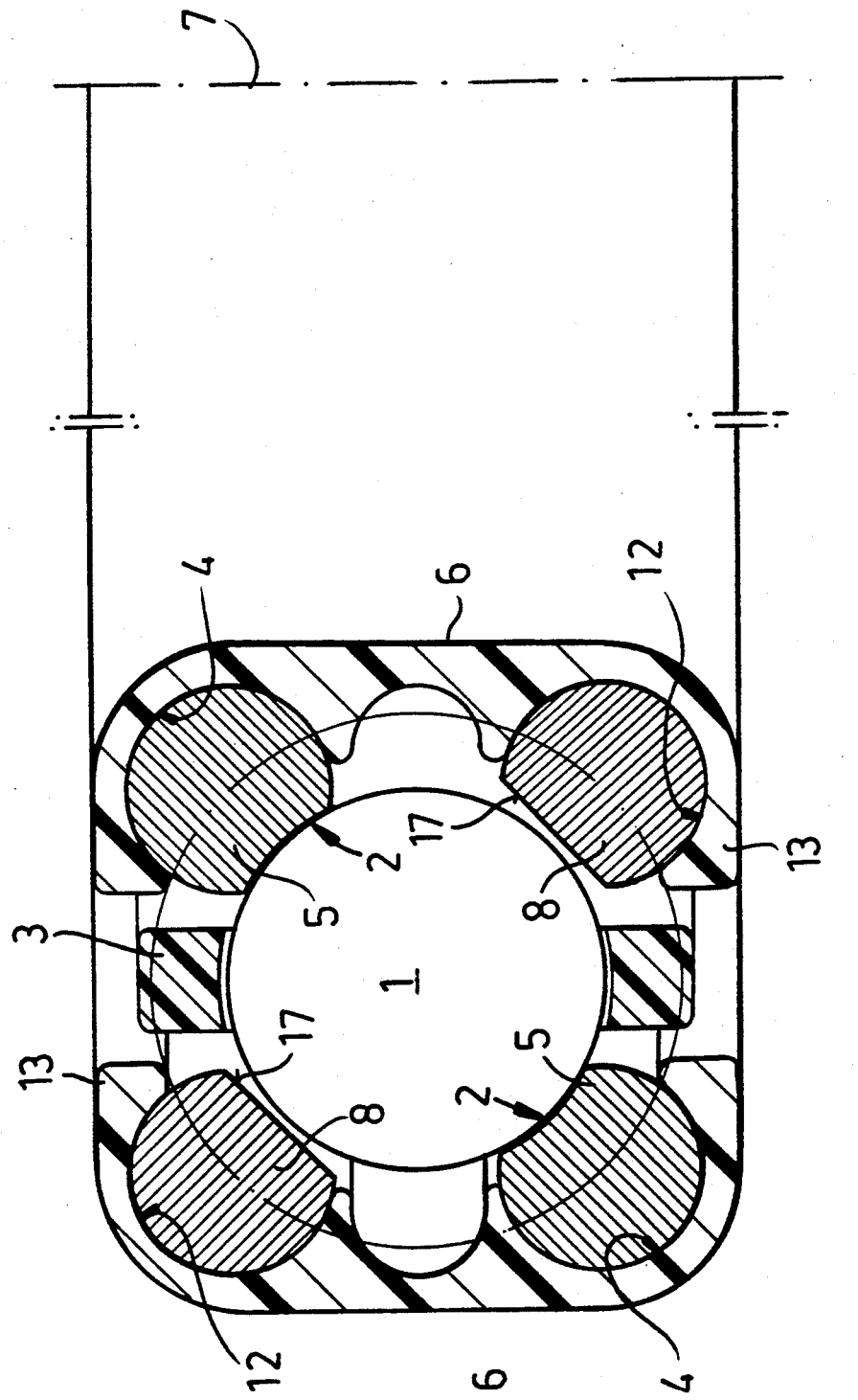

ROLLING BEARING

FIELD OF THE INVENTION

Our present invention relates to a rolling bearing of a type which can be used as a radial bearing or as an axial bearing and, more particularly, to a rolling bearing of the kind in which a race or the races are formed from a wire whose ends substantially abut or define a small tolerance gap with one another.

BACKGROUND OF THE INVENTION

German Patent Document DE 35 12 711 describes a rolling bearing which can be used as a radial or axial bearing in which the rolling elements ride upon races formed by race rings received in a race ring bed, the race rings themselves being constituted by wires which have their ends in abutting relationship or defining a small tolerance gap with one another and received in grooves of the bearing for the two bearing halves. In this system, in grooves of the bearing between the race rings and the groove walls, casing rings are received which are braced radially and axially against the walls of the bearing grooves and which form race ring beds receiving the race rings on their sides turned toward the latter.

In the following description, we will refer to strips, springs or rings which will have abutting ends, substantially abutting ends, ends which form a small tolerance gap or ends which are juxtaposed or adjoin. All of these terms are intended to mean that the ends should come as close to one another as is practicable to ensure the formation of a substantially continuous ring. In some cases that means that there will be actual contact so that the junction itself will be scarcely discernible and corresponding surfaces at the two ends will be flush with one another so that there will be true continuity of the ring.

In some cases, however, a gap will form between the two ends or will be formed between the two ends. That gap may be desirable to prevent the ring from being forced from its bed or to permit thermal expansion without deforming the ring. Such a gap is referred to as a tolerance gap herein and where reference is made to substantially abutting relationship, for example, or the other terms defined herein are used, it will be understood that the relationship of the ends is such as to permit actual contact or the existence of the tolerance gap.

Rolling bearings of the type described in German Patent Document DE 35 12 711 have their casing rings shaped to correspond substantially to the geometry of the race ring beds and to the race rings and distribute the force received from the race rings to the walls of the bearing grooves of the housing or shaft, thereby providing high bearing precision and good force distribution per unit area and low force development per unit area.

The casing rings are similar to the inner and outer races of conventional bearings which receive the rolling elements and roll-element cage between them and are circumstantially continuous. They generally form part of a preassembled bearing which is marketed as a complete unit and must be installed as such or disassembled when the two casing rings are to be inserted separately or prestressing of the casing rings is desired. It may be noted, in this regard, that it is not uncommon to desire to provide the outer casing ring with a radially inward prestress and the inner casing ring with a radially outward prestress. Means is generally provided to hold the casing rings together until such disassembly is desired.

Prestress of this earlier construction is difficult and expensive to carry out, requires casing rings of special materials and cannot make use of casing rings of plastics or synthetic resins.

In Japanese Patent Document JP 56-3318A as found in Patent Abstracts of Japan, a wire rolling bearing is described in which the casing ring is provided with at least one holder for a spring ring composed of wire.

German Patent Document DE-OS 26 25 806 describes a wire rolling bearing in which the casing ring is composed of a plastic.

European Patent Document 0 157 935 B1 discloses a wire rolling bearing in which an elastic casing ring is provided with an annular groove in which the race ring is received.

German Patent Document DE-PS 27 29 354 describes a wire ball bearing in which the race wire is set into an open groove in each of the opposite mutually longitudinally shiftable bearing parts so that the width of the opening of the grooves is less than the diameter of the race wire so that in cross section the groove walls extend over 180° around the race wire.

Wire rolling bearings with radially inwardly or radially outwardly elastically prestressed race rings are also found in German Patent Document DE-PS 37 40 755.

From the publication ROTHE ERDE Wire Rolling Bearing, publication 1008/89, it is known to provide the wire rolling bearing with sealing lips which each elastically engage the other bearing ring in the assembled bearing to form a seal therewith.

From U.S. Pat. No. 3,304,138 we learn of ball bearings which can have at least one bearing ring which is reinforced by a support ring which can be composed of plastic (synthetic resin) having reinforcing inlays-such as reinforcing fibers, filaments, wires and/or fabrics.

OBJECTS OF THE INVENTION

It is, therefore, the principal object of the present invention to provide an improved rolling bearing which does not require special means for holding the bearing in its assembled state and also does not require any prestress on the casing rings.

Another object of this invention is to provide an improved rolling bearing utilizing wire races whereby drawbacks of earlier bearing systems are avoided.

Still another object of this invention is to provide a rolling bearing of the type wherein each casing ring or a casing ring can be composed of a plastic (synthetic resin) material.

SUMMARY OF THE INVENTION

These objects and others which will become apparent hereinafter area attained, in accordance with the invention by providing the casing ring of a synthetic resin (plastic strip whose ends meet in a joint, i.e. in abutting relationship or in a small tolerance gaps as described and is formed with a holder extending in the ring direction for at least one spring ring composed of a wire and also having its ends substantially adjoining in a joint with, if desired, a small tolerance gap. The spring ring is formfittingly received in the holder with respect to the radial direction and the joint of the spring ring is so annularly offset about the axis of the bearing from the casing ring in the holder that the spring ring and casing ring are in force-transmitting relationship with one another so that the spring ring and the casing ring, by the tangential forces exerted upon one another are retained in a closed ring shape.

When the reference is made herein to form fittingly or form locking relationship of two parts, we mean that these parts so interfit that when a force is applied tending to separate the two parts in a particular direction, the nature of the interfit and the fact that the interfit includes overhanging portions prevents the separation.

More specifically, the rolling bearing of the invention, capable of use as an axial bearing or as a radial bearing comprises at least one casing ring receivable in a groove of a part adapted to accommodate the rolling bearing, braced radially and axially against walls of the groove, formed from an elongated strip having opposite ends juxtaposed and in substantially abutting relationship with one another at a junction, and provided with at least one substantially annular recess forming a bed;

means received in the casing ring forming a substantially annular race;

a plurality of rolling elements distributed around the casing ring and riding on the race ring; and a spring ring formed from a bent resilient wire retained in the bed and having opposite ends juxtaposed and in substantially abutting relationship with one another at a junction angularly offset about an axis of the rolling bearing from the junction of the ends of the strip and in such force-transmitting relationship with the strip that the strip and the wire exert tangentially effective forces upon one another retaining the strip and the wire in a closed annular form.

The strip of plastic forming the casing, i.e. the casing strip, can be extruded continuously as a rectilinear profile with high precision and advantageously is composed of a thermoplastic, such as a polyamide, which can be reinforced, if desired, with glass fibers, or from an elastomer, for example, an acrylic rubber.

The continuous strand of the extruded material can be cut to lengths and bent to form the open ring. The natural tendency of the material to relax back into its straight configuration is prevented by the spring ring which is pressed into the holder. The spring ring itself may be prebent into the arcuate configuration so that the tangential forces between the spring ring and the casing ring are maintained in their closed annular shapes, thereby ensuring that the preassembled bearing will not fall apart.

The spring ring, therefore, tends to hold the casing rings in the circular form which is necessary to ensure that the assembled state of the bearing with the rolling elements and cage between the casing rings, will be maintained.

In a preferred embodiment of the invention, the wire cross section of the spring ring is so surrounded and enclosed by the holder which is elastically braced thereagainst that the tangential forces between the spring ring and the casing ring are formed by the friction forces between them.

According to a feature of the invention, the spring ring and/or the holder engaging same have one or more of their juxtaposed surfaces provided with formations which increase the tangential force transfer between them, this surface profiling being, for example, a milled or knurled configuration, e.g. arrays of grooves or flutes or arrays of ridges.

It has also been found to be advantageous to improve the coupling between the walls of the bearing grooves of the housing shaft and the respective casing rings by providing the casing rings along their outer axial annular surfaces with end toothing structures, for example Hirth teeth, so that in the circumferential direction, there will be a good adhesion of the casing ring in the bearing groove and in the axial direction there will be a slight yielding of the spring ring facilitating bearing positioning or setting.

In an especially preferred embodiment of the invention the holder of the casing ring strip is formed as an annular groove in the casing ring, the walls of this groove engaging the spring ring with an elastic pressing force and form lockingly engaging the spring ring in a direction which is radial with respect to the bearing axis. The holder and the spring ring can be provided in addition to the race ring bed and the race itself. When, however, the holder is formed as an annular groove it is possible for this annular groove to constitute the race ring bed and for the spring ring to constitute the race ring or, stated otherwise, for the race ring to be constituted as the spring ring.

In the case of an axial bearing, the spring ring can brace the casing ring radially inwardly. In the case of a radial bearing, the radially outermost casing ring can be prestressed radially inwardly while the radially inwardly disposed casing ring can be prestressed radially outwardly.

According to still another feature of the invention, especially in the case of a radial separation of the bearing, the casing rings can be formed with two spaced apart lateral grooves separated by an intermediate groove lying between them, the axially outwardly disposed wall parts of the groove cross sections extending toward the median plane of the respective casing ring and beyond the latter. The intermediate groove can form a race ring bed and the lateral grooves can be used either as race ring beds or as annular grooves for the spring rings or as both where a spring ring and race ring are formed by the same wire.

Without altering the casing strip cross section, therefore, and exclusively by selective insertion of race rings and spring rings in the various grooves of the casing rings, we can obtain grooved ball bearings inclined on angle contact ball bearings, four-point ball bearings, cross roller bearings or the like.

This can be achieved especially simply when, in accordance with a further teaching of the invention, in the assembled bearing, the lateral grooves and the intermediate grooves of both casing rings have diametrically opposite cross sectional configurations constituting segments of a circle projecting beyond the lateral or intermediate grooves into the path of the rolling elements which ride upon the races. Preferably the walls of the lateral grooves have cross sections whereby they extend through more than 180° to provide the requisite form locking engagement of the spring ring or race ring received in the groove.

According to another feature of the invention, the casing rings can be provided with sealing lips formed unitarily with the casing ring strips and which, in the assembled bearing, axially or radially sealingly bear against the other casing ring and thereby completely seal the interior of the bearing from the exterior. The casing rings can be provided with reinforcing inlays such as reinforcing fibers, threads and/or wires, thereby increasing the mechanical strength of the casing ring and improving the ability of the bearing to withstand high operating temperatures.

BRIEF DESCRIPTION OF THE DRAWING

The above and other objects, features and advantages of our invention will become more readily apparent from the following description, reference being made to the accompanying highly diagrammatic drawing in which:

FIG. 4 is a cross section through an inclined ball bearing according to the invention;

SPECIFIC DESCRIPTION

Figure 1:
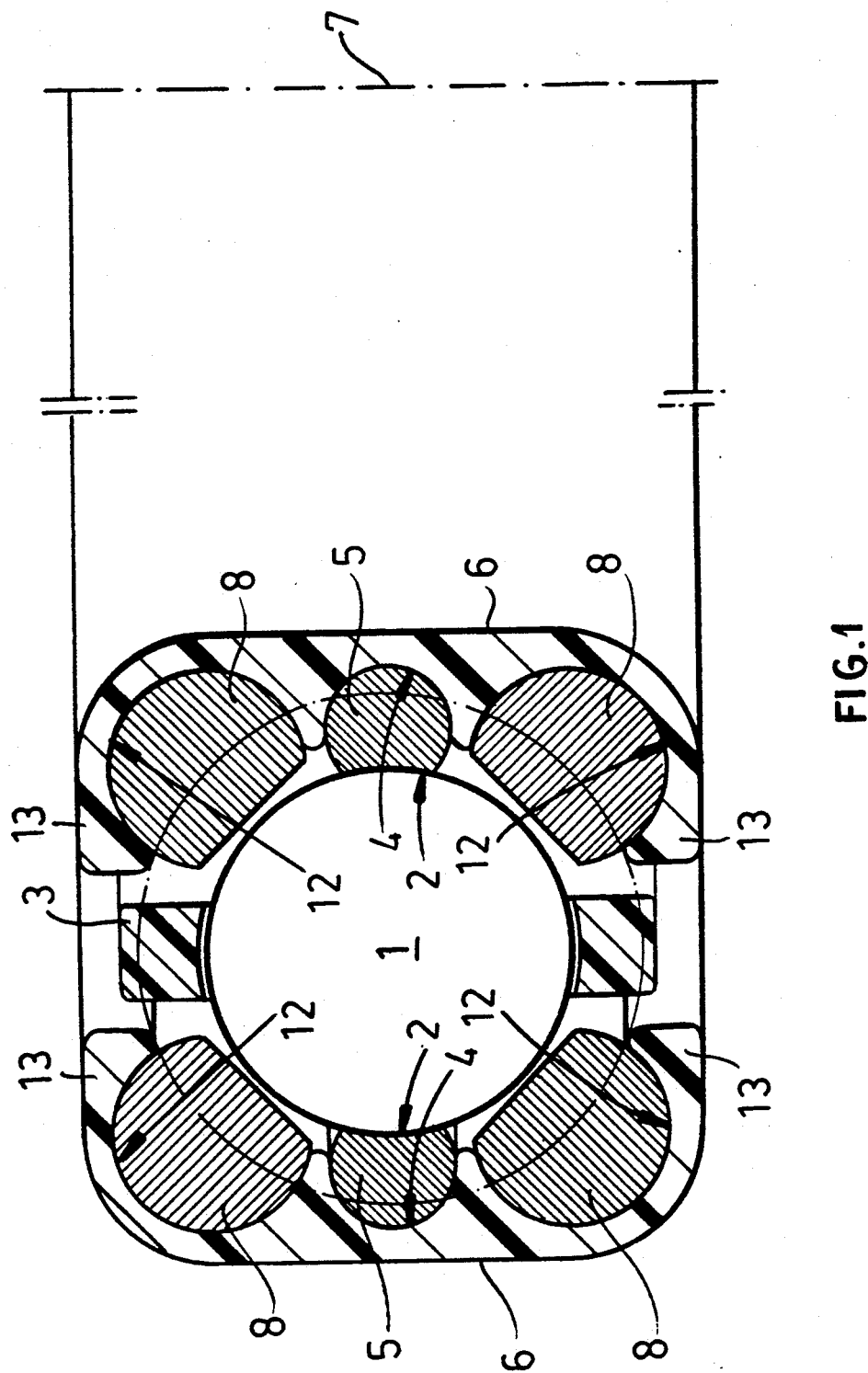
FIG. 1 is a cross sectional view through a ball bearing according to the invention in a configuration in which the bearing is constituted as a grooved ball bearing.

The rolling bearing illustrated in the drawing has a bearing axis 7 which can be the common axis of a shaft S and a housing H (see FIG. 1A) with the shaft S and the housing H each being formed with a bearing groove BG and BG', the flanks of which may be provided with Hirth teeth HT and HT', if desired. The casings described in greater detail below are received in the outer and inner grooves, receive the spring rings and race rings in the form of wires and have their various junctions offset from one another as has been shown diagrammatically in FIG. 1A as well. For example, in FIG. 1 the outer race ring 5 is shown to have a junction 5a in the form of a tolerance gap which is angularly offset from the junction or tolerance gap 6a between the ends of the outer casing 6 and to be equally offset from the junction or tolerance gap 5a' of the inner race ring 5 and the tolerance gap or junction 6a' of the inner casing ring 6.

The bearings shown in the drawing have cages 3 holding the rolling elements 1, e.g. balls or rollers, in equispaced relationship. The rolling elements 1 ride upon races 2 which are formed by race rings 5 received in race ring beds 4. The latter are grooves formed in the casing rings 6. Spring rings are designated at 8 in the drawing and when the drawing contains the reference character 5, 8, this should be understood to mean that the race ring is formed by a spring ring or that the spring ring also constitutes a race ring.

The race rings 5 are wires which have between their ends a junction as has been described at 5a, 5a' at which they may abut or form a small tolerance gap.

Figure 1A:
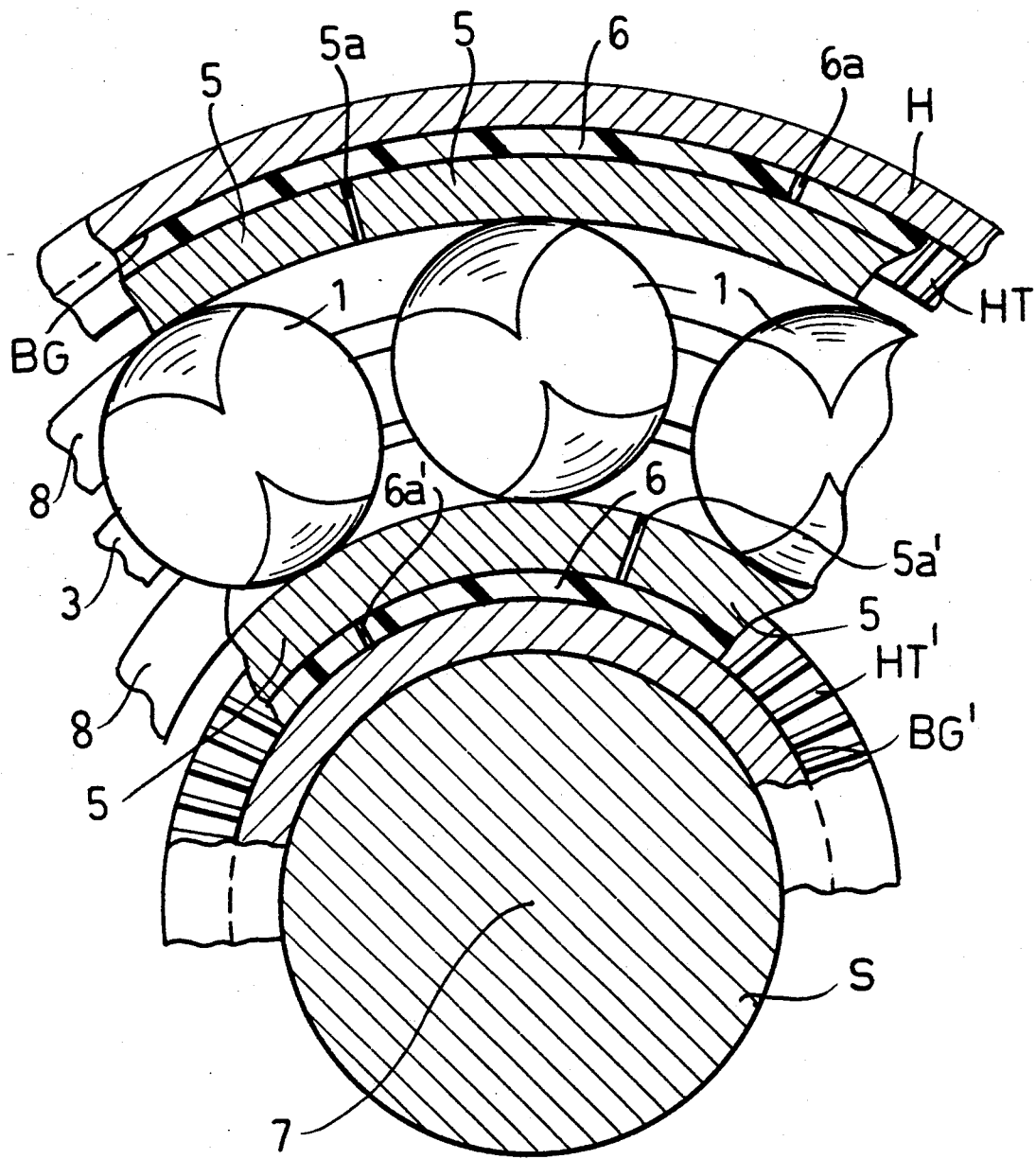
FIG. 1A is a fragmentary detail section of a bearing utilizing the principles of FIG. 1.

The race ring beds 4 are formed in the casing rings 6 disposed on opposite sides of the bearing separation and receive, in the installed state, in bearing grooves which have been described in FIG. 1A and are not otherwise illustrated in the drawing, enabling the parts carrying these grooves to be rotated relative to one another with the bearing serving as the journaling medium.

The race rings 6 are radially and axially braced against the walls of these bearing grooves so that bearing loads are distributed to the race rings 5 and from the race rings through the casing ring 6 to the walls of the bearing grooves with large-area contact, thereby minimizing the force per unit area.

The casing rings 6 are constituted, in turn, of plastic strips, preferably of a thermoplastic or thermosetting synthetic resin or an elastomer, so disposed that the ends of each strip also abut or form a small tolerance gap as has been illustrated and described at 6a and 6a'.

Each of these casing ring strips is formed with at least one holder extending in the ring direction and receiving a steel spring wire which forms the spring ring 8 and preferably a hardened steel wire of spring steel.

The spring rings 8 are received form fittingly in the respective holders in the direction radial to the bearing axis 7 so that the casing ring 6 cannot by itself release from the spring ring 8. The ends of the spring ring 8 also form junctions or tolerance gaps which are offset from the junctions of the casing ring 6 in the circumferential direction. The spring rings 8 and the respective casing rings at the holder of the latter are in force-transmitting relationship so that, with the offset of the junctions and the transmission of force between the spring rings and the casing ring, a tangential force is generated between them which holds the spring ring and the casing ring in a closed ring shape. Basically, therefore, the spring ring 8 imparts to the composite formed by the spring ring and the casing ring 6 a closed circular shape utilizing the friction force generated between the spring ring and the casing ring. In the embodiment shown, the holders described can be grooves or beds similar to those employed for the race ring.

To improve the adhesion between the casing ring and the spring ring, or to reduce slip and thereby generate the maximum tangential friction force, the surfaces of the spring ring and the casing ring in contact with one another may be profiled, roughened or otherwise contoured.

Figure 6A:
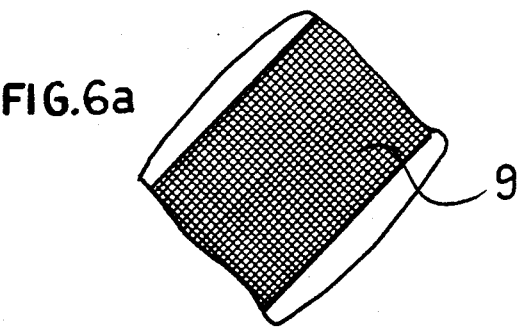
FIG. 6a is a view in the direction of the arrow VIa of FIG. 6.

For example, as can be seen from FIG. 6a, the surface 9 of the groove 12 forming the holder 4 for a spring ring 8 may be provided with a groove and ridge pattern, for example knurling or milling to increase the tangential force.

Figure 6:
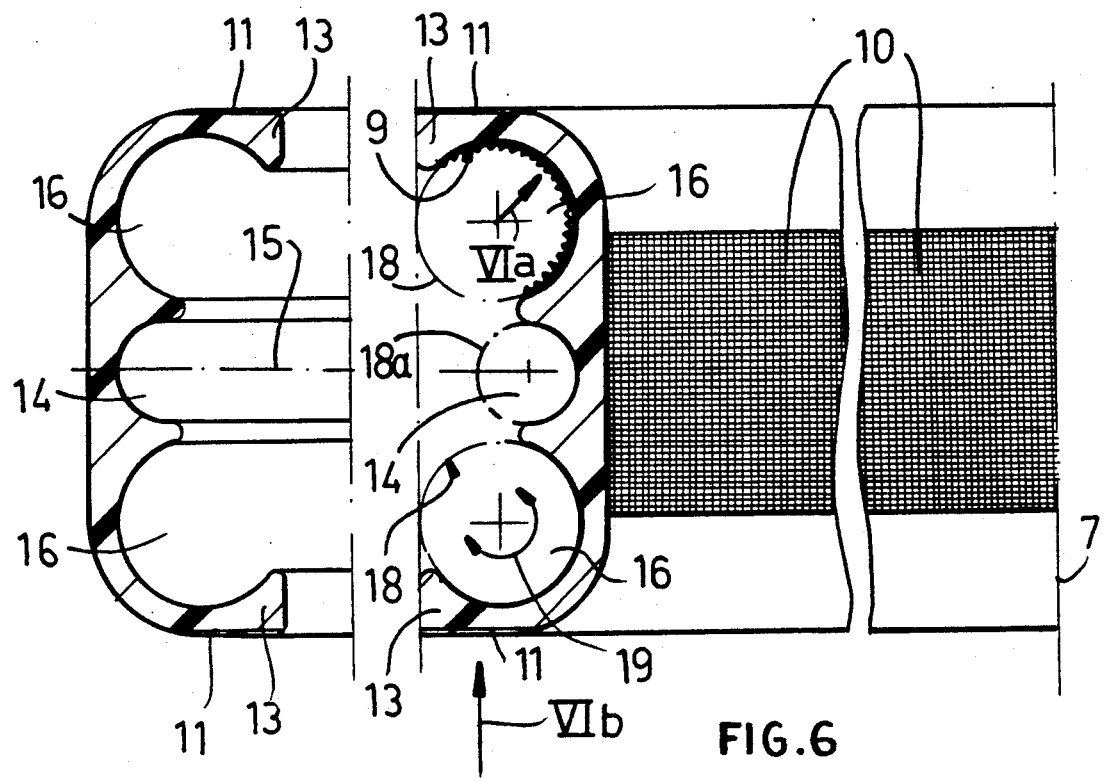
FIG. 6 is a cross sectional view through two casing rings of the type which can be used for the embodiments of FIGS. 1 through 5.
Figure 6B:
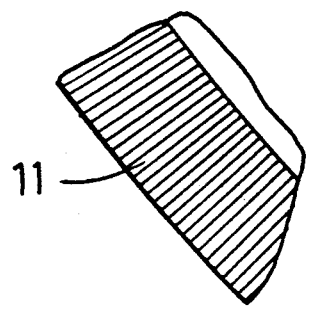
FIG. 6b is a view in the direction of the arrow VIb of FIG. 6 drawn to a smaller scale.
Figure 7:
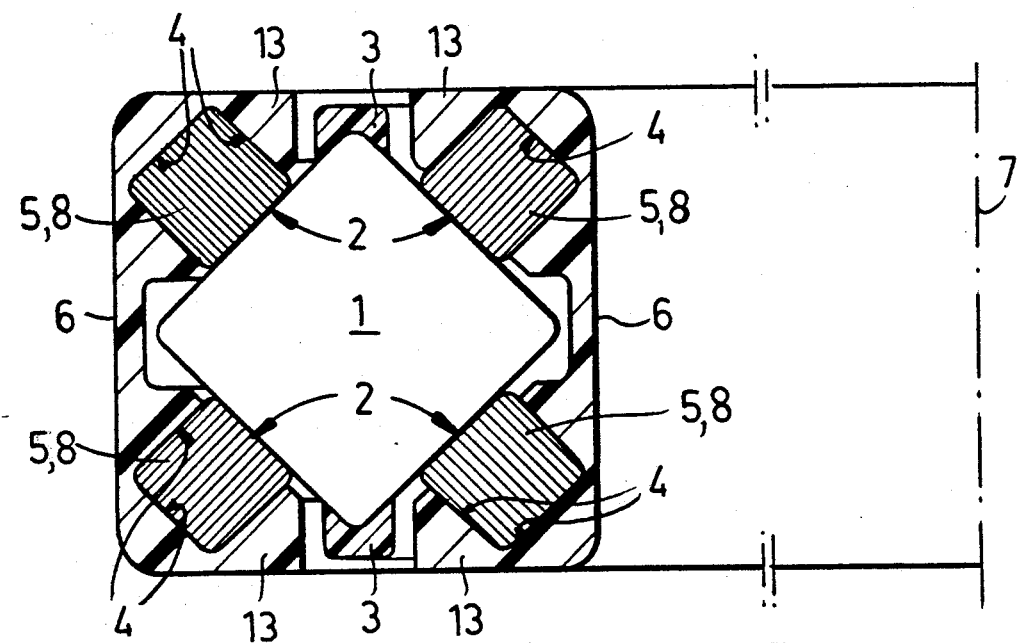
FIGS. 7 through 10 are cross sectional views generally similar to FIG. 1 but illustrating further embodiments of the invention.
Figure 8:
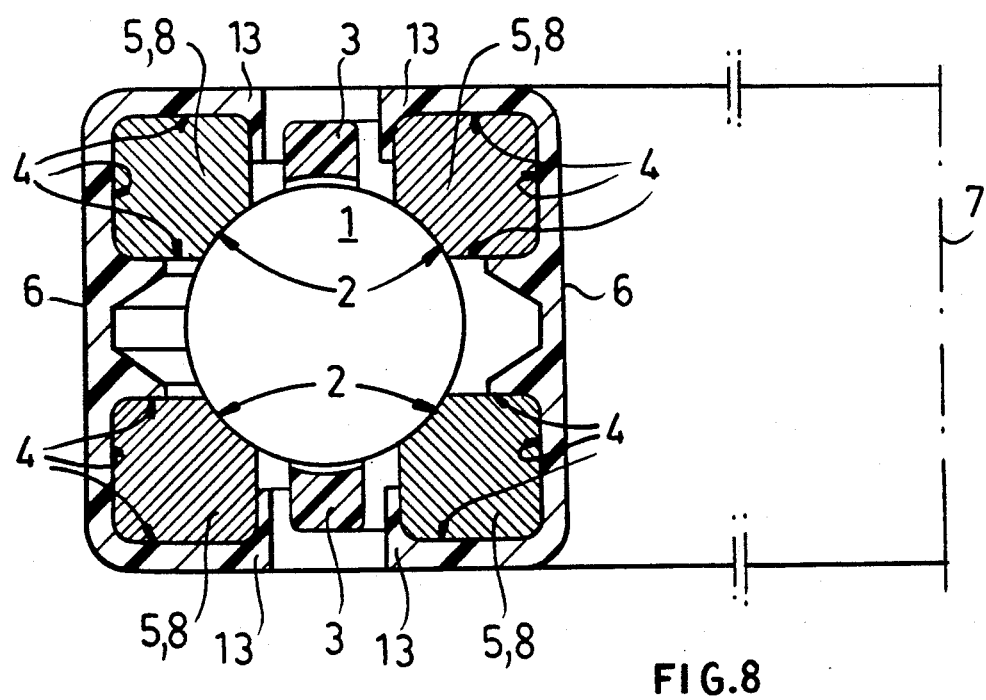
Figure 9:
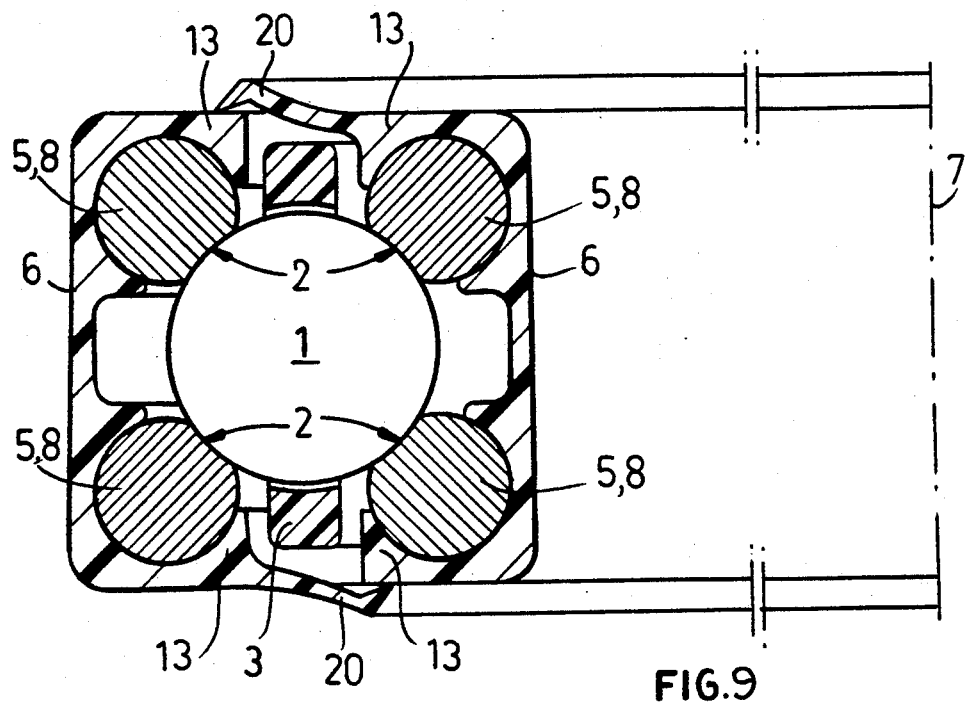
Figure 10:
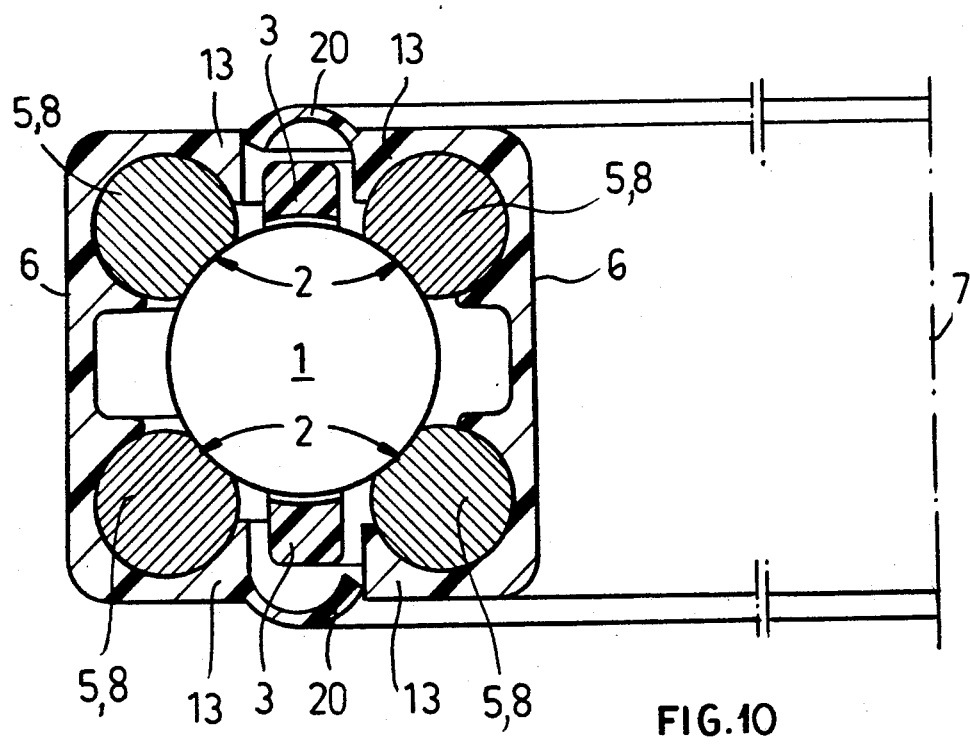

FIG. 6 and FIG. 6b also show that the casing ring 6 can have their outer axial and radial annular surfaces provided with profiling such as a milling pattern 10 or as is clear from 6b, Hirth toothing. The surface contours formed at 10 and 11 provide improved adhesion of the casing rings 6 in the circumferential direction to the walls of the bearing grooves. The teeth 11 of the casing ring 6 on the opposite axial faces of the bearing provide in the axial direction also some yieldability which can be advantageous for setting the bearing in place.

In all of the embodiments illustrated, the holder of the casing ring is formed as an annular groove 12 therein. Of course, when its spring ring forms a race, that groove may be represented at 4, 12 to indicate that it is also the race bed.

The wall of the groove 12 serves to clamp the spring ring 8 with an elastic pressing force and form fittingly fixes the spring ring 8 with respect to movement in a direction radial to the bearing axis 7. To enable the spring ring 8 to be seated in the annular groove 12, force must be exerted to press the spring ring into the groove by spreading the wall portions of the groove which overhang the spring ring. Once the spring ring 8 is clamped in its groove 12 it cannot be inadvertently separated therefrom. A separation of the two rings 6 and 8 is then only possible when the wall portions 13 overhanging the spring ring of the casing ring 6 are so bent that a sufficient opening is provided to allow the spring ring 8 to be pulled out of the groove 12. The spring ring 8 and the annular groove can be provided in addition to the race ring 5 and the race bed 4 as will be apparent from FIGS. 1 and 4.

In FIG. 1, the two race rings 5 form a grooved ball bearing while each of the casing rings 6 has a pair of spring rings 8 which impart the circular configuration to the casing rings 6 and hold the assembled bearing together.

FIG. 4 shows the case in which the bearing is in the form of an inclined ball bearing each casing ring here having a race ring 5 and a spring ring 8, the race rings and spring rings being disposed diametrically opposite one another. It is possible, moreover, to provide all of the grooves receiving spring ring or race ring wires with the configuration of the groove 12 or the bed 4 or to have separate configurations for the spring ring grooves 12 and the race ring beds 5.

In FIGS. 2, 5 and 7 through 10 the spring rings and race rings are one and the same and may be represented at 5, 8, being accommodated in spring ring or race ring beds 4, 12.

For the embodiment of FIG. 1, the casing ring 6 (FIG. 6) have two spaced apart lateral grooves 16 and an intermediate groove 14 between them.

For all of the lateral grooves 16 the groove cross section together with the axially outwardly disposed wall portions 13 extend in the direction of the median plane 15 of the casing ring to ensure the radial trapping of the respective wire rings 5 or 8 or 5, 8 therein. The lateral grooves 16 thus serve as race ring beds 4 for race rings 5 and for annular grooves 12 for spring rings 8. The intermediate groove 14 does not have an overhanging or undercut configuration so that it can only serve as a race ring bed 4 for a grooved ball bearing in accordance with the embodiment of FIG. 1.

Figure 2:
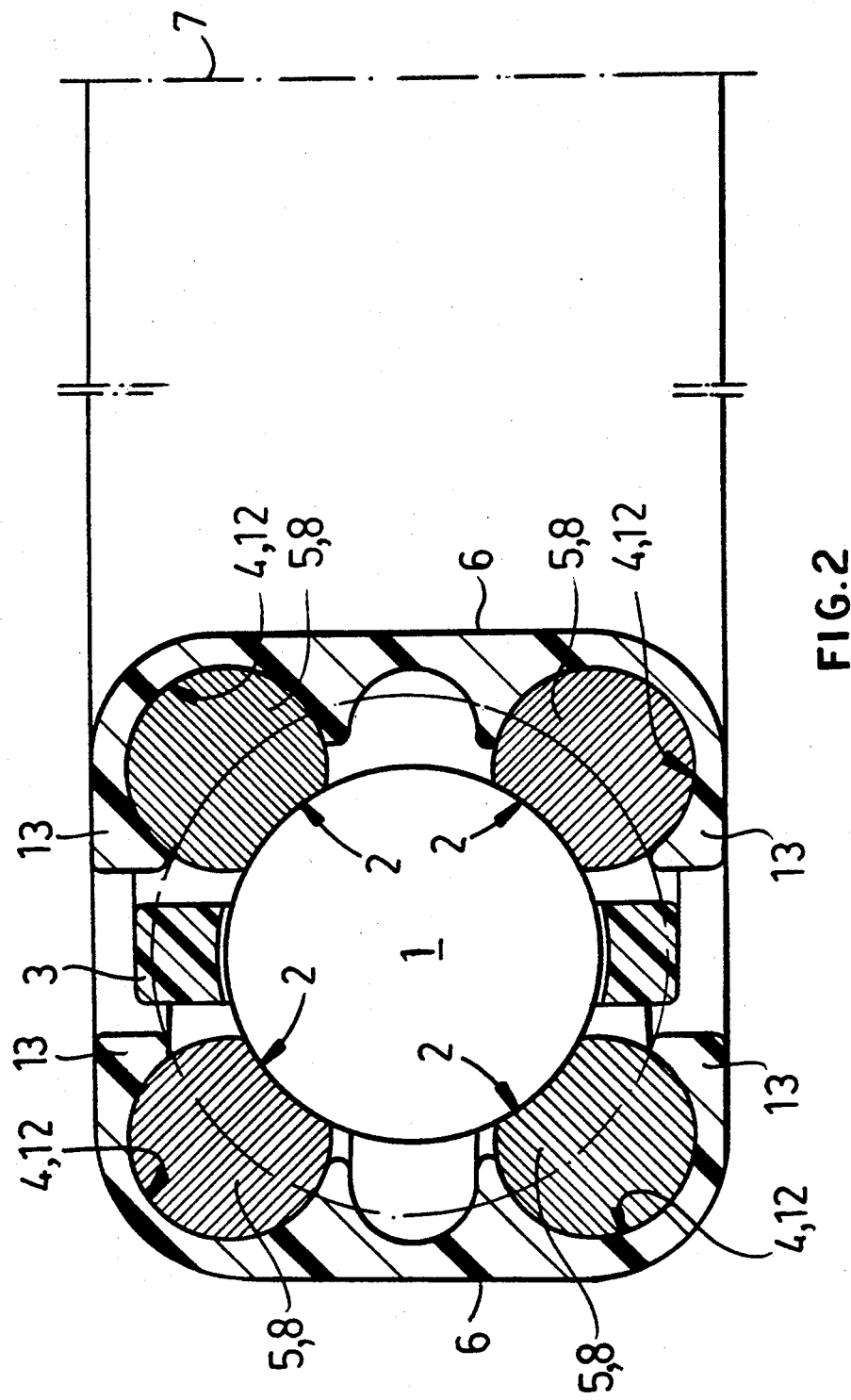
FIG. 2 is a cross sectional view through a four-point ball bearing of the invention.

In FIG. 2 all of the race rings also are formed by the spring rings 5, 8 so that all four wire rings 5, 8 formed with the races 2 for the balls 1.

In the case of the inclined bearing of FIG. 4, only two race rings 5 are provided with the races 2 in diametrically opposite lateral grooves while in the other pair of diametrically opposite lateral grooves, the spring rings 8 are seated. These spring rings can have their cross sections truncated to form secant surfaces 17 which do not contact the balls 1.

Figure 5:
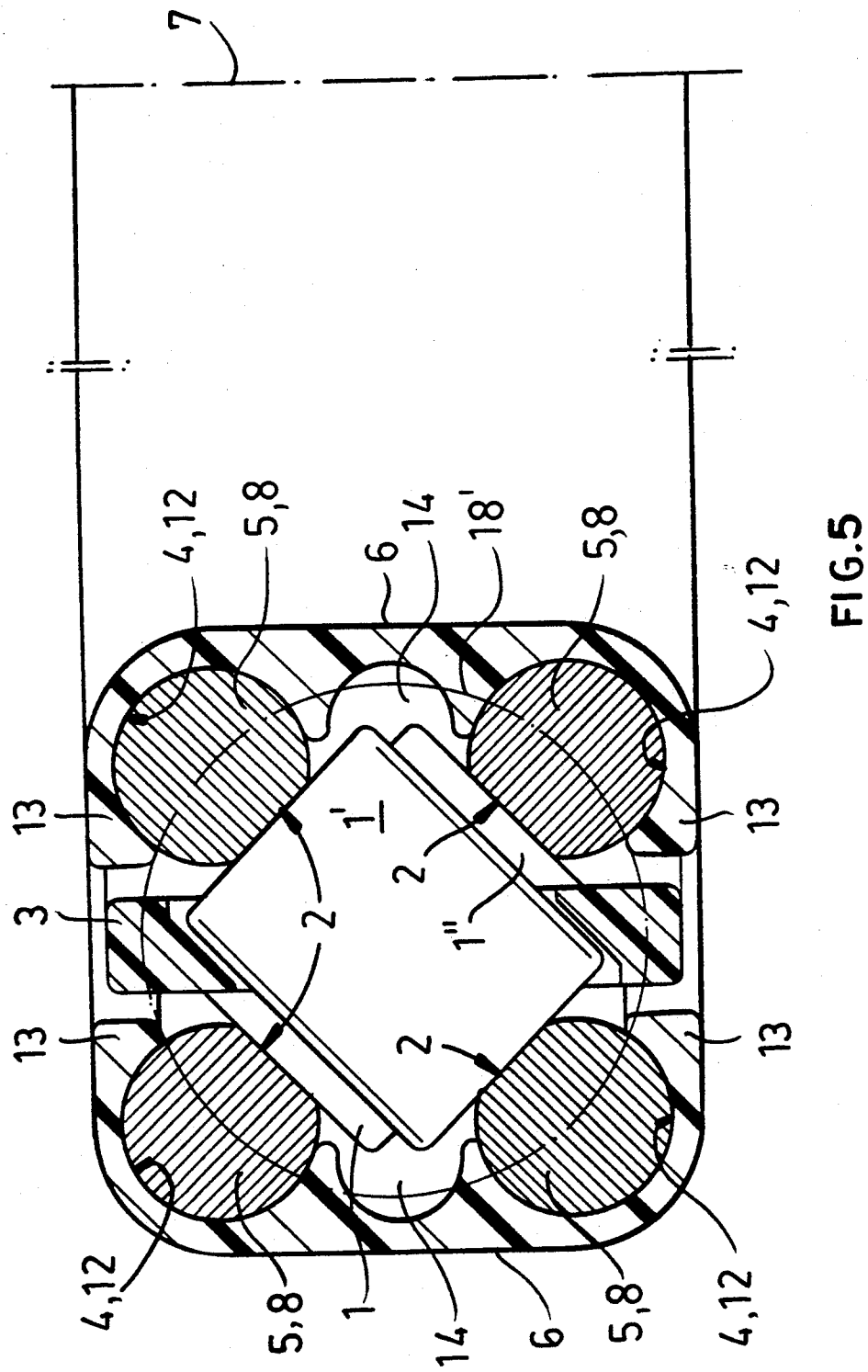
FIG. 5 is a cross sectional view of a rolling bearing in an embodiment in which it is a cross roller bearing.

FIG. 5 shows an embodiment of the invention in the form of a cross roller bearing in which the rolling elements are rollers 1' and 1".

In this case all four lateral grooves 16 receive combined race rings and spring rings 5, 8 with race surfaces 2 engaged by the rollers 1' and 1". The two rollers can alternate with one another and have mutually perpendicular axes, the intermediate grooves 14 providing clearance for the edges of the rollers.

In the assembled bearing the lateral grooves 16 and the intermediate grooves 14 of the two casing rings are disposed in pairs diametrically opposite one another.

The grooves 4, 12 and 14, 16 lie along a circle 18' and, as shown in FIG. 6, the walls of the lateral grooves and intermediate grooves 14, 16 lie along circles 18 and 18a in the path of the rolling elements 1', 1" so that a rolling element will engage the races 2 of one pair or the other pair of the wire rings 5, 8 and will not contact the secantial surfaces of the rings which do not form races for that roller. It is not essential, for the purposes of the invention that the grooves have a circular configuration. For example, in FIGS. 7 and 8 the race rings 5 and spring rings 8 are received in lateral grooves 16 conforming substantially to the rectangular wire configuration.

When the cross section of the lateral grooves 16 is circular, the lateral walls should subtend and angle 19 (FIG. 6) which is in excess of 90°.

The casing rings 6 are composed of synthetic resin of plastic and can have sealing lips 20 formed unitarily thereon and braced axially (FIG. 9) or radially (FIG. 10) against the other casing ring to seal the interior of the bearing from the exterior.

Figure 3A:
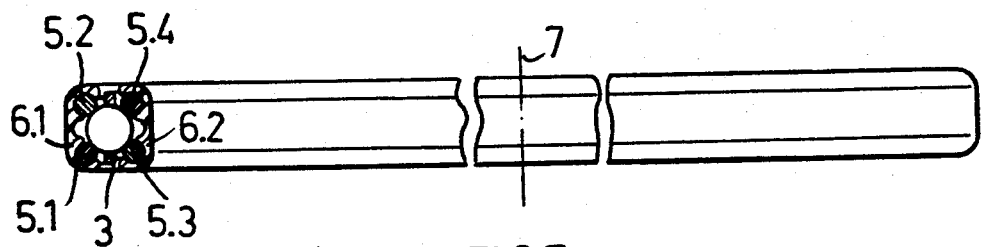
FIG. 3a is a side elevational view partly broken away of the bearing of FIG. 2.
Figure 3B:
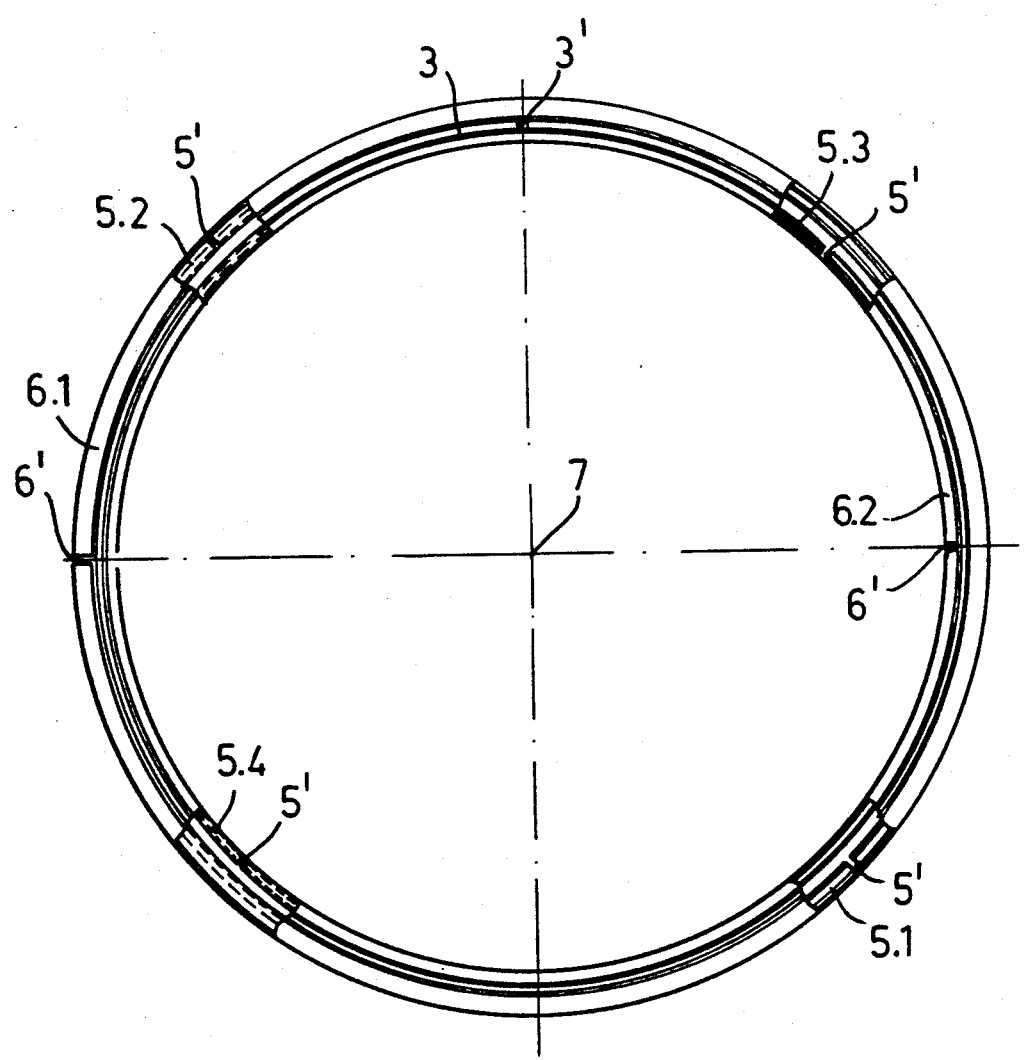
FIG. 3b is an axial view, partly in section, of the bearing of FIG. 2 drawn to a smaller scale than is found in FIG. 2.

FIGS. 3a and 3b have been provided to show a preferred positioning of the junctions.

The junctions 6' for the casing ring 6.1 and 6.2 can lie diametrically opposite one another. The junctions 5' of the race rings 5.1, 5.2, 5.3 and 5.4 can be offset by 45° from the junctions 6' and offset from one another by 90°. The junction 3' of the cage ring 3 is offset from the junction 6' by 90° and from the junctions 5' by 45° at no point around the bearing do two junctions coincide. The spacing between the junctions 5' and 6' of about 45°. has been found to prevent any significant tangential slip between the casing rings and the race rings or spring rings.

We claim:

1. A rolling bearing capable of use as an axial bearing or as a radial bearing, said rolling bearing comprising:
   at least one casing ring receivable in a groove of a part adapted to accommodate said rolling bearing, braced radially and axially against walls of said groove, formed from an elongated strip having opposite ends juxtaposed and in substantially abutting relationship with one another at a junction, and provided with at least one substantially annular recess forming a bed;
   means received in said casing ring forming a substantially annular race;
   a plurality of rolling elements distributed around said casing ring and riding on said race ring; and
   a spring ring formed from a bent resilient wire retained in said bed and having opposite ends juxtaposed and in substantially abutting relationship with one another at a junction angularly offset about an axis of said rolling bearing from the junction of the ends of said strip and in such force-transmitting relationship with said strip that said strip and said wire exert tangentially effective forces upon one another retaining said strip and said wire in a closed annular form.

2. The rolling bearing defined in claim 1 wherein:
   a further casing ring is provided and is receivable in another groove of a part adapted to accommodate said rolling bearing, said further casing ring is braced radially and axially against walls of said other groove, is formed from a further elongated strip having opposite ends juxtaposed and in substantially abutting relationship with one another at a junction, and is provided with at least one substantially annular recess forming a bed;

means is received in said further casing ring forming a substantially annular race ring;

said plurality of rolling elements are distributed around said further casing ring and ride on said race ring of said further casing ring; and a further spring ring formed from a bent resilient wire is received in said bed of said further casing ring and has opposite ends juxtaposed and in substantially abutting relationship with one another at a junction angularly offset about said axis from the junction of the ends of said strip of said further casing and in such force-transmitting relationship with said further strip that said further strip and said further wire exert tangentially effective forces upon one another retaining said further strip and said further wire in a closed annular form.

3. The rolling bearing defined in claim 2 wherein said spring ring has its cross section so retained in said bed and elastically engaged by said strip that said tangentially effective forces mutually acting on said strip and said wire are formed by frictional forces between them.

4. The rolling bearing defined in claim 2 wherein said spring ring has its cross section so retained in said bed and elastically engaged by said strip that said tangentially effective forces mutually acting on said strip and said wire are enhanced by a surface profiling of at least one of a pair of mutually contacting surfaces of said strip and said wire.

5. The rolling bearing defined in claim 4 wherein said profiling is a groove pattern.

6. The rolling bearing defined in claim 4 wherein said profiling is a ridge pattern.

7. The rolling bearing defined in claim 4 wherein said profiling is formed on both said strip and on said wire.

8. The rolling bearing defined in claim 2 wherein said casing rings are composed of a synthetic resin provided with a reinforcement selected from the group which consists of reinforcing fibers, threads or wires.

9. The rolling bearing defined in claim 2 wherein said casing rings have sealing lips formed laterally thereon and engaging one another elastically to seal a space between said casing rings within which said rolling elements ride.

10. The rolling bearing defined in claim 9 wherein said lips are radially elastic.

11. The rolling bearing defined in claim 9 wherein said lips are axially elastic.

12. The rolling bearing defined in claim 1 wherein said casing ring is formed with profiling on outer axial and radial annular surfaces.

13. The rolling bearing defined in claim 12 wherein said profiling is in the form of Hirth teeth.

14. The rolling bearing defined in claim 1 wherein said casing ring is formed with end grooves adjacent opposite axial ends of said casing ring and an intermediate groove between said end grooves, said intermediate groove being configured to receive a substantially annular race and said end grooves being configured to selectively receive a respective spring ring and an annular race.

15. The rolling bearing defined in claim 14 wherein two of said casing rings are juxtaposed with one another radially in said bearing and receive said rolling elements between them, grooves of said casing rings being diametrically opposite one another in pairs and having circular segmental cross sections of circles extending into a path of said rolling elements around said axis.

16. The rolling bearing defined in claim 15 wherein said end grooves have cross sections subtending arcs of more than 180°.

17. The rolling bearing defined in claim 1 wherein said bed is a substantially annular groove formed in said casing ring and having walls resiliently clamping said spring ring in said bed with an elastic force constantly maintained by said walls on said spring ring and formlockingly retaining said spring ring in said bed in a radial direction.

18. The rolling bearing defined in claim 17 wherein said spring ring is formed with said substantially annular race.

19. The rolling bearing defined in claim 17 wherein said race is formed by a further wire received in a substantially annular groove formed in said strip in addition to said bed and having opposite ends juxtaposed and in substantially abutting relationship with one another at a junction angularly offset about said axis the others of said junctions.

20. The rolling bearing defined in claim 1 wherein:

for an axial bearing said spring ring has a prestress radially inwardly; and for a radial bearing said spring ring has a prestress radially inwardly for an outer casing ring and a prestress radially outwardly for an inner casing ring.

* * * * *

UNITED STATES PATENT AND TRADEMARK OFFICE
CERTIFICATE OF CORRECTION

PATENT NO. : 5 071 264

DATED : 10 December 1991

INVENTOR(S) : Egon FRANKE et al.

It is certified that error appears in the above-identified patent and that said Letters Patent is hereby corrected as shown below:

Cover Page, Item [73] Assignees: should read:

--Franke & Heydrich KG, Aalen, KMF Maschinenfabrik GmbH, Bopfingen, both of Fed. Rep. of Germany--.

Signed and Sealed this

Thirteenth Day of April, 1993

Attest:

STEPHEN G. KUNIN

Attesting Officer

Acting Commissioner of Patents and Trademarks